Oct. 26, 1965   A. J. WELDEN   3,213,605
FLUID ACTUATED MECHANISM
Filed Feb. 28, 1964   2 Sheets-Sheet 1
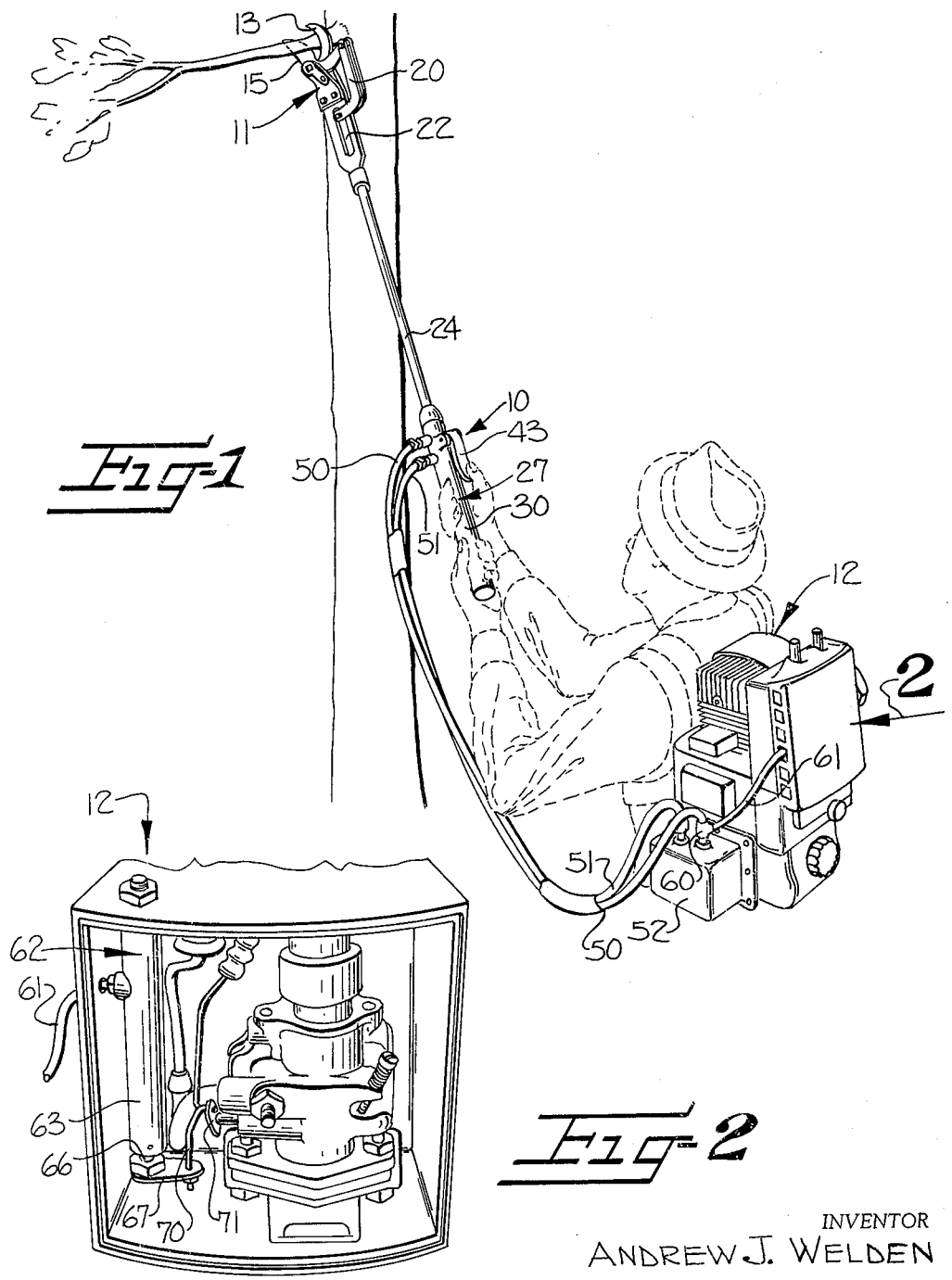
INVENTOR
ANDREW J. WELDEN
BY
ATTORNEY

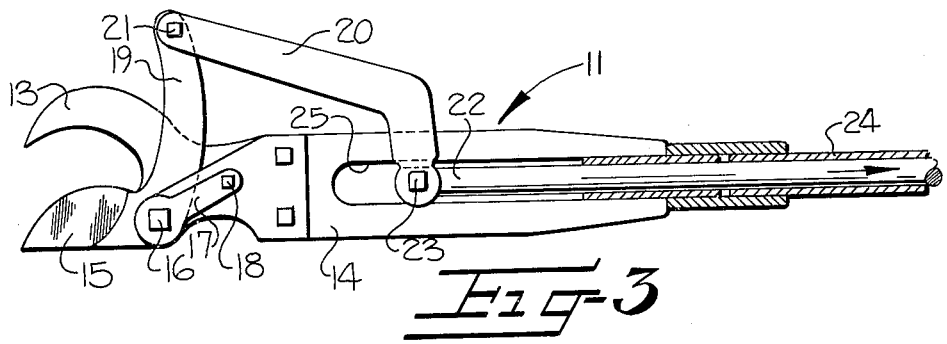
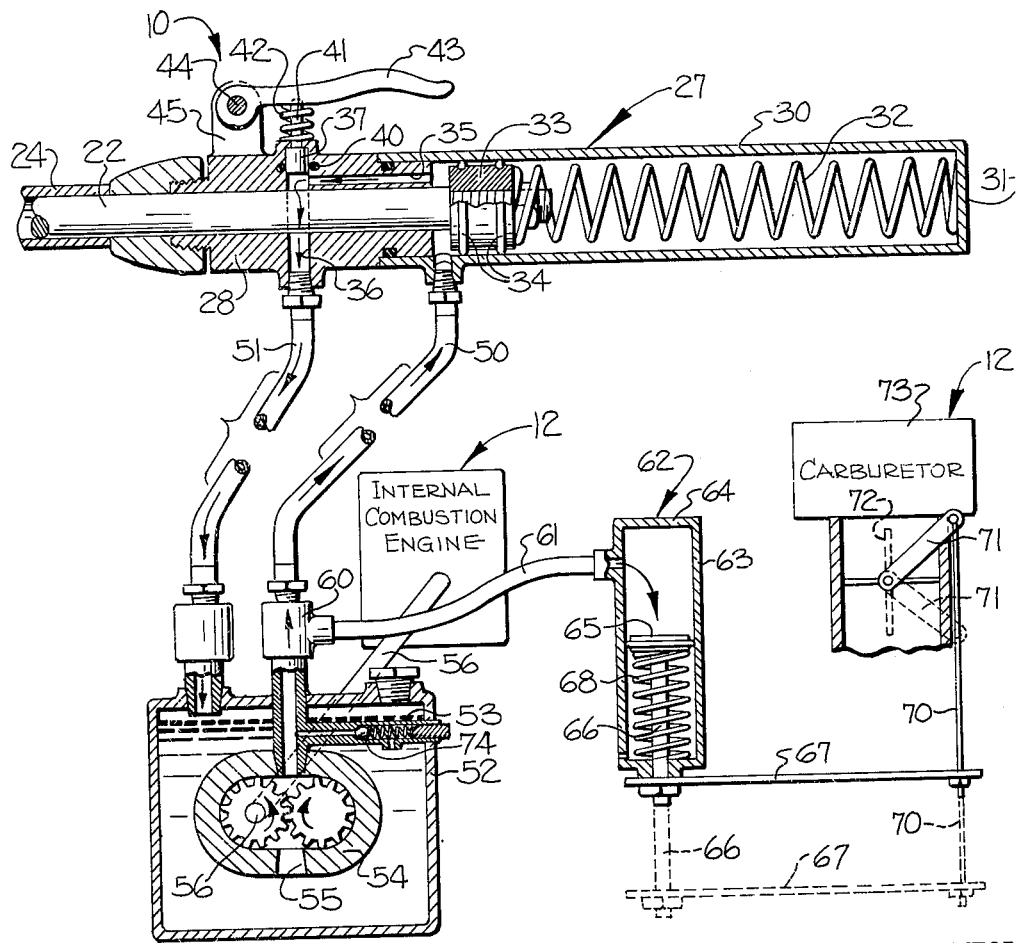

United States Patent Office 3,213,605
Patented Oct. 26, 1965

3,213,605
FLUID ACTUATED MECHANISM
Andrew Jackson Welden, 4287 Palm Springs Drive,
East Point, Ga.
Filed Feb. 28, 1964, Ser. No. 348,211
2 Claims. (Cl. 60—19)

This invention relates to fluid actuated mechanisms, and more specifically to means for selectively energizing and de-energizing without appreciable time lag any desired tool operatively connected to the mechanism of the present invention.

The invention is useful with a variety of tools and other devices with which fluid under pressure may be satisfactorily employed as an activating medium. The invention finds particular utility when used to power tools or devices requiring quick response or in which a quick recovery is particularly desirable and wherein a continuously portable self-generating power system is advantageous.

By way of illustration, the invention is illustrated and described in connection with a portable tree pruning device comprising shear elements to which the device of the present invention is operatively connected. Prior attempts to provide the requisite amount of power for such jobs as cutting tree branches without objectionable time lag have resulted in the utilization of large tractor-driven or trailer-mounted air compressors or hydraulic pumps. Consequently, the utility of such prior known devices is limited to areas accessible by vehicular travel.

It is therefore the object of this invention to provide a power source and means for selectively energizing and de-energizing a tool such as a tree branch pruning shear assembly which is sufficiently portable to be carried by one man while he is operating the tool, and which will supply the requisite power to energize the tool without objectionable time lag. Similarly, the present invention permits the tool to be readily de-energized without objectionable time lag when desired. This can be an important safety factor.

It is a further object of this invention to provide a device of the type described wherein all component parts of the device are maintained at approximately atmospheric pressure when the tool is de-energized and wherein such component parts remain at approximately atmospheric pressure until control means in the device are actuated to energize the tool. The advantages of an open system which is free of excessive pressure are apparent in that the operator is not subjected to the danger of a rupture or failure in the system which might cause personal injury or property damage. The risk of such injury or damage is heightened by the portability of the device and the attendant risk of the operator stumbling or otherwise losing control of the equipment. The absence of pressure in the system, except when the control valve is manipulated to energize the tool obviates the risk of injury or damage through rupture of the parts under pressure.

Some of the objects of the invention having been stated, other objects will appear as the description proceeds when read in connection with the accompanying drawings, in which—

FIGURE 1 is a perspective view illustrating the portability of the present invention and showing it operatively connected to a tree trimming apparatus;

FIGURE 2 is a perspective view looking in the direction of the arrow indicated at 2 in FIGURE 1, and with the cover of the engine removed to illustrate the throttle control assembly or hydraulic governor;

FIGURE 3 is a side view of the pruning shear assembly, partially in section in association with which the present invention is described;

FIGURE 4 is a somewhat schematic sectional view illustrating the valving arrangement, throttle control, hydraulic means and power source utilized to manipulate the pruning shears in FIGURE 3.

Referring more specifically to the drawings, the actuating mechanism of the invention is operatively connected to a pruning shear assembly generally designated at 11 and to a portable source of power such as an internal combustion engine, broadly indicated at 12. The engine 12 is preferably of light weight construction and of the 2-cycle type commonly used to power portable chain saws. The engine is preferably mounted on a suitable harness and carried on the back of the operator as illustrated in FIGURE 1.

The pruning shear assembly 11 preferably comprises a stationary blade 13 secured to the end of a slotted tubular support 14. A movable blade 15 is pivotally connected to the stationary blade as by a pivot pin or bolt 16. Means are provided for preventing turning movement of the bolt 16 under the influence of the moving blade 15, and as shown in FIGURE 3 such means may include a small box wrench 17 secured at one end to the bolt 16 with the other end of the wrench 17 being secured to the stationary blade as by a fastener element 18. A crank arm 19 formed integrally with the movable blade 15 is pivotally connected to a link 20 as by a pin 21. The other end of the link 20 is pivotally connected to a reciprocable shaft 22 as by a pin 23, it being noted that the end portion of the shaft 22 to which the link 20 is connected is disposed within the slotted tubular support 14, access to the shaft 22 being gained through an axial slot 25 in the support member 14.

The reciprocable shaft 22 extends through a sleeve 24 and the housing of a control valve assembly 27 connected to the end of the sleeve 24 remote from the pruning shear assembly 11. The end of the shaft 22 remote from the pruning shear assembly 11 is disposed within a cylinder 30 which forms a part of the control valve assembly 27. The cylinder 30 has a closed end 31, the other end of the cylinder being closed by the housing 28 of valve assembly 27 to which the cylinder 30 is fixed.

A compression spring 32 bears against the inner surface of the end wall 31 and is connected at its other end to a piston 33 mounted within the sleeve 30. The piston 33 is fixed about the end of the reciprocating shaft 22 remote from the pruning shear assembly 11 and the piston 33 is provided with suitable O-rings 34 to provide a tight fit between the piston 33 and the walls of the cylinder 30.

The valve housing 28 has an axially extending bore 35 therein which extends between and communicates with a radial bore 36 and the interior of the cylinder 30. The juncture of the axial bore 35 with the radial bore 36 is closable by a control valve 37 provided with a suitable O-ring 40 and a stem 41 extending through the valve housing 28 and outwardly therefrom. The portion of the stem 41 which extends outwardly from the valve housing 28 is surrounded by a compression spring 42, one end of which bears against the housing 28 and the other end of which bears against a handle 43 pivotally connected to the valve housing 28 as by a pin 44 and a pair of brackets 45 between which one end of the handle 43 is positioned.

An inlet or supply line 50 is connected to the valve housing 28 for communication with the interior of the cylinder 30 between the valve housing 28 and the proximal face of the piston 33. The end of the cylinder 30 adjacent the valve housing 28 thus provides communication between the inlet line 50 and the axial bore 35 in the housing 28. An outlet or return line 51 is communicatively connected to the radial bore 36 in valve housing 28. Thus, when the valve 37 is in open or inoperative position, there is free communication from the inlet line 50, through the end of the cylinder 30 adjacent the valve housing 28, through the axial bore 35 and the radial bore 36 to the outlet line 51.

The inlet line 50 and the outlet line 51 extend from the actuating mechanism 10, as just described, to a reservoir 52 containing a supply of liquid such as hydraulic fluid 53, the outlet or return line 51 communicating with the interior of the reservoir, while the inlet line 50 extends through the wall of the reservoir 52 and is communicatively connected to a gear pump 54 disposed within the reservoir 52. Hydraulic fluid 53 enters the gear pump 54 through an orifice 55 in the housing of the gear pump.

The gear pump 54 is operatively connected to the drive shaft 56 of the internal combustion engine 12, as schematically illustrated in FIGURE 4. Energization of the engine 12 drives the gear pump 54 which causes hydraulic fluid 53 to be pumped into the line 50, through the end of the cylinder 30 adjacent the valve housing 28, through the axial bore 35, through the radial bore 36 and into the outlet line 51 which returns the fluid to the reservoir 52. It will be appreciated that the system as thus described is normally open and not under pressure even while engine 12 is running at idling speed, or at any speed, until the control valve 37 is manipulated to close the return line 51 to actuate the tool connected to the reciprocable shaft 22.

A T fitting 60 is interposed in the inlet line 50 between the actuating mechanism 10 and the reservoir 52, and a branch line 61 extends from the T fitting 60 to a servo mechanism or hydraulic governor broadly indicated at 62 and comprising a cylinder 63 closed at one end as at 64. A piston 65 is reciprocably mounted within the cylinder 63, the relative dimensions of the piston 65 and the inside area of the cylinder 63 being such as to provide a snug fit between these two elements. A stem or connecting rod 66 extends from the piston 65 in a direction away from the end wall 64 and outwardly through the other end of the cylinder 63, where it is connected to a link 67. A compression spring 68 extends between the piston 65 and the end of the cylinder 63 adjacent the link 67 for normally urging the piston 65 toward the cylinder wall 64.

The end of the link 67 remote from the stem 66 is connected to a rod 70, the other end of which is connected to an arm 71 which in turn is operatively connected to a butterfly valve 72 of a carburetor 73 of the engine 12.

*Operation*

When it is desired to actuate a tool connected to the reciprocable shaft 22, such as the pruning shear assembly 11, assuming the engine 12 to be operating at idling speed, the blades 13 and 15 are disposed on opposite sides of the branch to be severed and downward pressure is applied on the handle 43 to overcome the spring 42 to move the control valve 37 inwardly of the valve housing 28 to seal off communication between the axial bore 35 and the radial bore 36 and close the return line 51.

As the pressure in the line 50 builds up, under action of the pump 54, a quantity of fluid will be forced into the branch line 61 to fill the upper end of the cylinder 63 and move the piston 65 away from the end wall 64, carrying the link 67 and the rod 70 toward the dotted line position shown in FIGURE 4. Downward movement of the rod 70 causes corresponding movement of the arm 71 and the butterfly valve 72 to the dotted line positions shown in FIGURE 4. The opening of the butterfly valve 72 causes the speed of the engine to increase thereby driving pump 54 at a faster rate and increasing the pressure in the entire system. The increased fluid pressure in the bore or conduit 35 and the cylinder 30 causes the piston 33 to overcome the spring 32 and move toward the end wall 31 of cylinder 30 moving the shaft 22 in the direction of the arrow in FIGURE 3. Movement of the shaft 22 in this manner imparts corresponding movement to the link 20 and the movable jaw 15 to sever the branch between the jaws 15 and 13.

The pressure in the system increases correspondingly with the amount of resistance encountered by the movable jaw 15 as it attempts to move toward the fixed jaw 13. As the pressure against the piston 33 builds up, an equal amount of pressure is built up against the piston 65 in the hydraulic governor 62 with the result that the speed of the engine increases proportionately with the resistance encountered by the movable jaw 15.

After the branch has been severed, the pressure on the handle 43 is released, thereby permitting the spring 42 to return the handle 43 to inoperative position and to raise the valve 37 from its seat to open communication between the axial bore 35 and the radial bore 36, thereby permitting the fluid which has accumulated in the cylinder 30 to return to the reservoir 52. The pressure on the piston 65 is reduced correspondingly with the reduction of the pressure on the piston 33 so that the spring 68 within the cylinder 63 of the hydraulic governor 62 is permitted to return the piston 65 to the full line position shown in FIGURE 4. The rod 70 and the arm 71 are moved correspondingly to return the butterfly valve to the vertical position shown in full lines in FIGURE 4, thereby reducing the speed of the engine to idling speed. The system is thus restored to an open system with all of the parts free from pressure until it is desired to again manipulate the control valve 37 to actuate the tool.

A pressure relief valve 74 is communicatively connected to the inlet line 50 within the reservoir 52. The relief valve 74 may be set at a predetermined pressure to prevent injury or damage to the operating mechanism in the event the tool meets with resistance of such magnitude as to be likely to cause failure of the structural components of the instant device.

It is thus seen that I have provided a continuously portable, self-generating, normally pressure-free fluid actuated mechanism which may be successfully employed with any one of a variety of tools operatively connected to the reciprocable shaft driven by the said power system.

In the drawings and specification there have been set forth preferred embodiments of the invention and, although specific terms are employed, they are used in a generic and descriptive sense only and not for purpose of limitation, the scope of the invention being defined in the claims.

I claim:
1. A portable power-driven device comprising:
 (a) an internal combustion engine;
 (b) a hydraulic circuit operatively connected to the engine and to a tool adapted to be driven thereby, said hydraulic circuit including;
  (i) a fluid reservoir;
  (ii) a gear pump within said reservoir and a mechanical drive extending between the pump and the engine;
  (iii) a flexible fluid supply line extending from the pump and a flexible fluid return line extending from the reservoir;
  (iv) a hydraulic motor including a cylinder and a reciprocable piston within the cylinder and a mechanical drive extending between the piston and said tool to drive the tool;
  (v) said hydraulic motor communicating with the ends of the supply and return lines remote from the reservoir and pump and said hydraulic motor including a manually controlled metering valve in the return line and selectively movable to provide open communication between the supply and return lines and to close the return line;

(vi) a servo mechanism arranged to control the throttle of said engine and responsive to an increase in pressure in the supply line to open the throttle of the engine and responsive to a decrease in pressure in the supply line to move the throttle toward closed position;

(c) the internal combustion engine, its servo mechanism throttle control, the fluid reservoir and its associated pump being combined together into a compact integral unit capable of being carried on a man's back, and;

(d) a supporting harness on which said compact integral unit is mounted for attachment to a man's back.

2. A structure according to claim 1 wherein said internal combustion engine is of the quick recovery type such as a two-cycle gasoline engine.

References Cited by the Examiner
UNITED STATES PATENTS

| | | | |
|---|---|---|---|
| 2,563,195 | 8/51 | Soule et al. | 144—104 |
| 2,690,712 | 10/54 | Foote | 60—52 X |
| 2,814,872 | 12/57 | Gerrans | 60—52 |
| 3,014,535 | 12/61 | Marindin | 60—52 X |
| 3,159,965 | 12/64 | Woolley et al. | 60—19 |
| 3,165,256 | 1/65 | Emmerich | 230—116 |

References Cited by the Applicant
UNITED STATES PATENTS

| | | |
|---|---|---|
| 2,155,247 | 4/39 | Warner. |
| 2,612,140 | 9/52 | Miller. |

JULIUS E. WEST, *Primary Examiner.*